May 6, 1952
H. W. BECKER
2,595,444
AMPLIFIER
Filed June 26, 1946
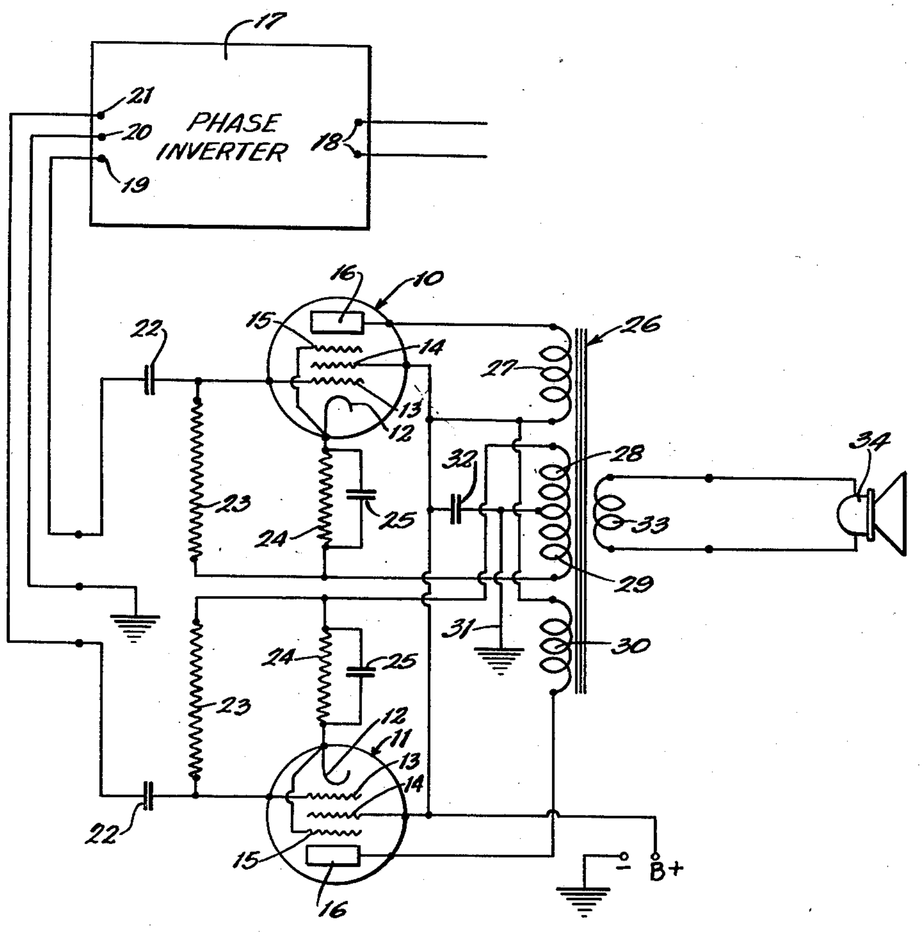
Inventor:
Harry W. Becker,
By Dawson, Booth and Spangenberg,
Attorneys.

Patented May 6, 1952

2,595,444

UNITED STATES PATENT OFFICE 2,595,444

AMPLIFIER

Harry W. Becker, Chicago, Ill.

Application June 26, 1946, Serial No. 679,345

4 Claims. (Cl. 179—171)

This invention relates to amplifiers and more particularly to electronic amplifiers suitable for class A, class B or class C voltage or power output amplification.

One of the objects of the invention is to provide an amplifier in which maximum output may be obtained from a minimum number of tubes and with distortion minimized or eliminated.

Another object is to provide an amplifier in which double or dual push-pull effect is produced in a circuit employing only two tubes.

Still another object is to provide an amplifier in which distortion is minimized or eliminated by the use of inverse feedback.

The above and other objects and advantages of the invention will be more readily apparent from the following description when read in connection with the accompanying drawing, in which—

The single figure is a circuit diagram of an amplifier embodying the invention.

The amplifier of the present invention embodies many of the features of the amplifier more particularly described and claimed in my copending application Serial No. 654,318, filed March 14, 1946, but is arranged to produce maximum undistorted output. The present amplifier differs from that of my prior application principally in the provision of a dual push-pull effect. As shown on the drawing, the amplifier comprises a pair of similar tubes 10 and 11 which are illustrated as pentodes, although tetrodes or beam power tubes could be used equally well. As shown, each tube includes a cathode 12, a control grid 13, a screen grid 14, a suppresser grid 15 and a plate 16. The tubes are supplied through a phase inverter 17 having input terminals 18 connected to any desired signal source and having three output terminals 19, 20 and 21. The terminal 20 is grounded as shown, and the terminals 19 and 21 are adapted to supply the input signal to the tubes respectively in 180° phase displaced position.

The control grids 13 of the tubes are connected respectively as shown through coupling condensers 22 to the terminals 19 and 21 of the phase inverter. The same input signal is, therefore, impressed on each of the tubes in inverse phase relationship across grid resistors 23. Grid bias resistors 24 bypassed by condensers 25 are provided for each tube.

The circuit further comprises a transformer indicated generally at 26 having four input windings 27, 28, 29 and 30. As shown, the windings 28 and 29 are formed by a single center tapped winding, although two entirely separate windings could be provided, if desired. The center tap is grounded as indicated at 31 and the outer end of the winding 29 is connected to the cathode of the tube 10 to complete its signal input circuit.

Similarly, the outer end of the winding 28 is connected to the cathode of the tube 11. The center tap between windings 28 and 29 is connected through a condenser 32 to the screen grids 14 of both tubes and to the inner ends of windings 27 and 30. As shown, the B supply is connected to the condenser 32 to be supplied to the screen grids 14 and through the windings 27 and 30 to the plates 16 of both tubes. The transformer is completed by a secondary winding 33 which may be connected to any desired load such as a loudspeaker 34. According to the present invention the windings 27 and 29 which are connected to the tube 10 are series aiding and are voltage opposing with respect to ground so that their phase relationship is inverse and the windings 28 and 30 which are connected to the tube 11 similarly voltage oppose each other. Also due to their manner of connection the windings 27 and 30 are series aiding and voltage oppose each other as do the windings 28 and 29.

In operation the signal is impressed on the control grid of each tube across the resistor 23 and one of the transformer windings 28 or 29 in series. Considering the tube 10, the voltage C across the transformer winding 28 is in phase and in series with the input signal voltage so that only the differential voltage is applied between the grid and cathode of the tube. The voltage appearing across the winding 28 is the result of amplification in the triode section of the tube including the cathode, the control grid and the screen grid 14 which acts as an anode and by induction as a result of the currents flowing in the transformer windings 27, 29 and 30. The voltage which appears across the winding 27 is the result of power amplification utilizing all of the elements of the tube as well as by induction due to currents flowing in the other transformer windings. It will be seen that the voltages appearing across the windings 27 and 29 are 180° out of phase, and the voltage across the winding 29 is, therefore, used as a negative or inverse feedback voltage to cancel noise and distortion. The tube 11 operates in the same manner through its connections to the windings 28 and 30. Since the voltages in windings 28 and 30 are out of phase with respect to the windings 27 and 29, the circuit provides two push-pull circuits connected in push-pull relationship to each other. The transformer secondary winding 33 delivers the power induced in it by the action of the windings 27 to 30 to the loud-speaker 34. With this arrangement the transformer windings 28 and 29 have a load impedance source connected to them which remains constant for all signal frequencies to provide a very high damping factor on the load thereby further eliminating distortion.

It will thus be seen that the present amplifier circuit provides a dual push-pull effect utilizing only two tubes and one compound transformer. This arrangement will deliver maximum undistorted power output substantially twice that obtainable with the same tubes connected conventionally.

From the foregoing description it will be evident that the circuits connecting the tubes 10 and 11 to the windings 29 and 28 define cathode follower circuits in which these windings carry the full emission currents of the corresponding cathodes and the corresponding screen grids 14 act as anodes. Moreover, the circuits including windings 27 and 30 and tubes 10 and 11, respectively, define conventional amplifier circuits wherein these windings carry the anode current flow of the corresponding tubes. By the term "conventional amplifier" in the specification and claims hereof, I mean an amplifier of the type wherein the load circuit is not part of the path across which input voltage appears. It is to be distinguished from the cathode follower type amplifier where the load circuit is connected in series with the cathode-control electrode space path across the input circuit.

While one embodiment of the invention has been shown and described in detail herein, it will be understood that this is illustrative only and is not intended as a definition of the scope of the invention, reference being had for this purpose to the appended claims.

What is claimed is:

1. An amplifier comprising a pair of electron discharge devices each having cathode, anode, control electrode and an additional electrode, a transformer having four windings, signal input means to impress signal voltages in an inverse phase relationship on the control electrodes of said devices, respectively, means connecting two of said windings to said cathodes respectively and defining cathode follower circuits including the cathodes, control electrodes, and auxiliary electrodes, means connecting the other two windings to the anodes of said devices respectively to define conventional amplifier circuits in conjunction therewith, the two windings connected to each device being arranged in series aiding relationship and the corresponding windings for the respective devices being opposed, and means defining a conductive current path directly from the cathode of each of said devices to the control electrode thereof.

2. An amplifier for use with a source of balanced signals comprising in combination, a pair of electron discharge devices each having cathode, anode, control electrode and an additional electrode, a transformer having four windings, circuit means connecting said source to said control electrodes respectively, means connecting two of said windings to said cathodes respectively and defining cathode follower circuits including the cathodes, control electrodes, and auxiliary electrodes, means connecting the other two windings to the anodes of said devices respectively to define conventional amplifier circuits in conjunction therewith, the two windings connected to each device being arranged in series aiding relationship and the corresponding windings for the respective devices being opposed, and means defining a conductive current path directly from the cathode of each said devices to the control electrode thereof.

3. An amplifier for use with a source of balanced signals having two outer terminals and a common terminal comprising a pair of electron discharge devices each having a cathode, anode, control electrode and auxiliary electrode, a transformer having four windings, connections from the control electrodes to the outer terminals of the signal source, a B supply source, connections from the anodes through two of the windings respectively and through the B supply source to the common terminal, connections from the auxiliary electrodes through the B supply source to the common terminal, connections from the common terminal through the other windings to the cathodes, the two windings connected to each device being arranged in series aiding relationship and the corresponding windings for the respective devices being opposed, and a condenser connected directly between each auxiliary electrode and the common terminal.

4. An amplifier for use with a source of balanced signals having two outer terminals and a common terminal comprising a pair of electron discharge devices each having a cathode, anode, control electrode and auxiliary electrode, a transformer having four windings, connections from the control electrodes to the outer terminals of the signal source, a B supply source, connections from the anodes through two of the windings respectively and through the B supply source to the common terminal, connections from the auxiliary electrodes through the B supply source to the common terminal, connections from the common terminal through the other windings to the cathodes, the two windings connected to each device being arranged in series aiding relationship and the corresponding windings for the respective devices being opposed, a conductive connection directly from the control electrode to the cathode of each of the devices, and a condenser connected directly between each auxiliary electrode and the common terminal.

HARRY W. BECKER.

REFERENCES CITED

The following references are of record in the file of this patent:

UNITED STATES PATENTS

| Number | Name | Date |
|---|---|---|
| 2,186,195 | Dalpayrat | Jan. 9, 1940 |
| 2,380,923 | Cannon | Aug. 7, 1945 |
| 2,411,517 | Busignies | Nov. 26, 1946 |
| 2,429,124 | Cunningham | Oct. 14, 1947 |
| 2,480,987 | Wallin | Sept. 6, 1949 |
| 2,481,533 | Pratt | Sept. 13, 1949 |

FOREIGN PATENTS

| Number | Country | Date |
|---|---|---|
| 830,657 | France | Aug. 5, 1938 |
| 216,071 | Switzerland | Nov. 1, 1941 |

OTHER REFERENCES

R. C. A. Tube Manual 1940 edition, page 210, 14—10. (Copy in Library of Congress.)